C. NELSON.
COFFEE MACHINE.
APPLICATION FILED FEB. 28, 1907.
1,056,048.
Patented Mar. 18, 1913.
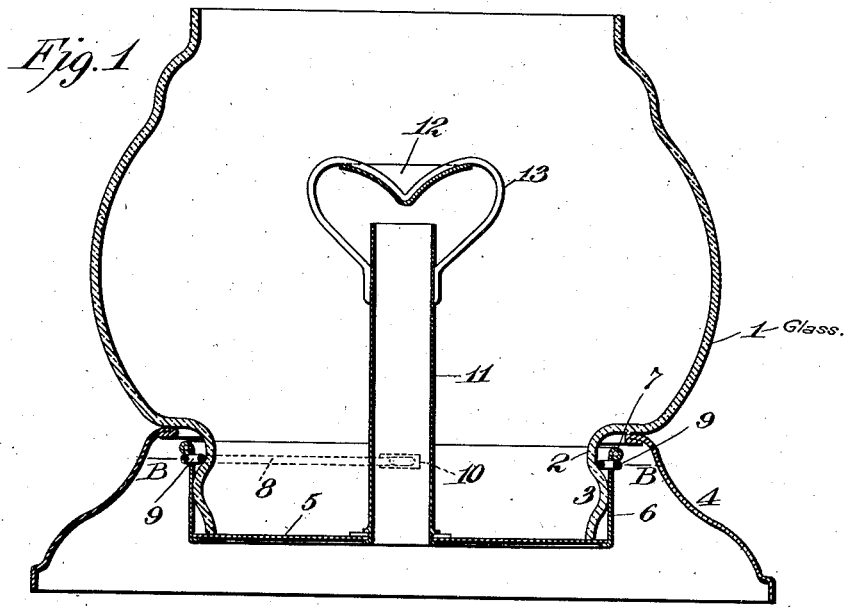
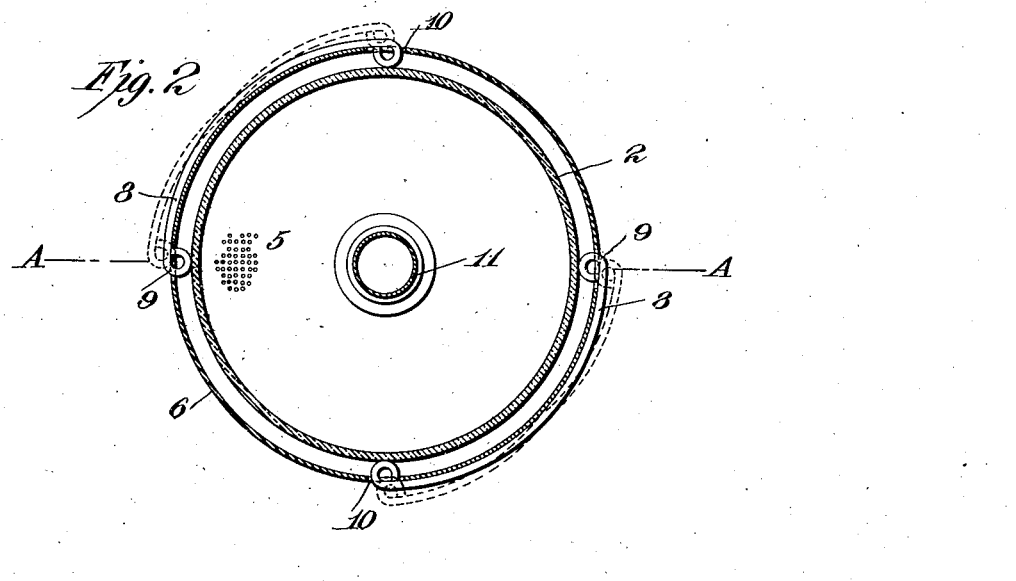
Witnesses:
Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & COMPANY, OF BROOKLYN, NEW YORK, A COPARTNERSHIP COMPOSED OF SIGMUND STERNAU AND LIONEL STRASSBURGER.

COFFEE-MACHINE.

1,056,048.   Specification of Letters Patent.   Patented Mar. 18, 1913.

Application filed February 28, 1907. Serial No. 359,749.

*To all whom it may concern:*

Be it known that I, CHARLES NELSON, a subject of the King of Sweden, residing in the borough of Brooklyn, in the county of Kings, city and State of New York, have invented Improvements in Coffee-Machines, of which the following is a specification.

The object I have in view is the production of a coffee machine in which the screen which holds the coffee or tea, or other substance which is to form the basis of the infusion, is secured to the globe in such a manner that as the globe is removed from the machine the screen will be lifted out with it.

Other objects I have in view relate to details of structure resulting in improvement in the deflecting plate which is arranged above the screen for the purpose of deflecting the hot water in the globe.

In the accompanying drawings, Figure 1 is a view, in section, of a device embodying my invention, taken on the line A—A, Fig. 2, Fig. 2 is a horizontal section taken on the line B—B, Fig. 1.

In the above views, like parts are designated by the same reference characters.

In carrying out my invention I provide a glass globe 1 having a restricted or contracted neck 2. This neck is provided with a bead or enlargement 3. That part of the globe 1, directly above the restricted neck 2, is adapted to rest on the upper edge of the upper part of the body 4 of the coffee machine. The opening within the body is somewhat larger than the neck, as shown in Fig. 1, the body 4 engaging with the body of the globe and not with the neck 2.

The support for the coffee, tea or other substance forming the basis of the infusion, is in the form of a screen 5 which is secured to the lower open end of the neck 2 of the globe. This screen forms the bottom of a vessel of which the annular continuous sides 6 are unperforated. These sides may be made integral with the screen 5 but are preferably made separate, as shown. The upper edge of the sides are formed with a bead 7. The screen is secured to the neck of the globe by means which engage with such globe above the bead 3. This means, as shown, consists of the spring wires 8. Two are shown which are secured upon diametrically opposite sides of the sides 6. The ends of the spring wire are formed with eyes 9, 9, and the body of the wire is bent to a curve of similar shape and radius as the curve of the sides 6. The center part of the wires are soldered or otherwise secured to the sides 6 in the position shown in Fig. 2, so that the eyes 9 will pass through openings 10 in the sides 6 and engage with the neck 2 of the globe. These wires 8 are sufficiently elastic to be bent to the dotted line position shown in Fig. 2, so that the eyes 9—9 may move over the bead 3 permitting the screen 5 to be removed from the neck of the globe. This is attained by bending the wires to the dotted line position, permitting the sides 6 to be removed from the neck. The size of the screen 5 and its sides 6, with the bead 7, is sufficiently small to permit the globe 1 to be removed through the opening in the top of the body 4, so that upon removing the globe 1 the screen 5 goes with it.

A central tube 11 is permanently attached to the center of the screen 5 with the center of the tube communicating with a central opening formed in the screen, such opening being of the same size as the bore of the tube. This tube 11 is for the purpose of inclosing the upper end of the tube which communicates with the percolating device. This is a common structure, being shown particularly in the patent of S. Sternau, Lionel Strassburger and John P. Steppe, No. 775,431, dated November 22, 1904. Upon the tube 11 is mounted the deflector plate 12. This deflector plate is of the shape shown in the form of a reversed cone, the apex being located immediately above the center of the tube 11. The plate 12 is best made of a stamping and is secured in place by means of a wire 13 which is heart-shaped as shown, the center part being soldered or otherwise secured to the upper sides of the plate 12, and its extremities soldered or otherwise secured to opposite sides of the tube 11. By securing the wire 13 to the upper side of the plate 12, the bottom thereof is entirely unobstructed, hence the liquid passing up through the pipe 11 will strike against the back of the plate and be deflected uniformly in all directions. To prevent interference with the liquid passing out in this manner, the wire 13 should be bent outward some distance, as shown in Fig. 1. The greater distance it is bent out the less it will interfere with the liquid.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now particularly described the nature of my invention, and in what manner the same is to be performed, what I claim and desire to secure by Letters Patent is:

1. A coffee machine having a globe with a neck, the said neck having a bead thereon, in combination with a screen having turned-up sides, the said sides carrying opposed springs, the said springs having bent extremities which extremities extend through openings in the bent-up sides and engage with the neck above the bead the springs being attached at their center to the turned-up sides.

2. A coffee machine having a globe with a neck, the said neck having a bead thereon, in combination with a screen having a turned up rim, said rim carrying a spring, the said spring having a bent extremity extending through an opening in the rim, and engaging with the neck above the rim.

This specification signed and witnessed this fifteenth day of February, 1907.

CHARLES NELSON.

Witnesses:
 JNO. ROBT. TAYLOR,
 LEONARD H. DYER.